United States Patent
Bai et al.

(10) Patent No.: US 8,209,848 B2
(45) Date of Patent: Jul. 3, 2012

(54) METHOD OF MAKING A PMR WRITER WITH SEAMLESS SHIELDS

(75) Inventors: Zhigang Bai, Milpitas, CA (US); Moris Dovek, San Jose, CA (US); Yan Wu, Cupertino, CA (US); Cherng-Chyi Han, San Jose, CA (US); Jiun-Ting Lee, Sunnyvale, CA (US)

(73) Assignee: Headway Technologies, Inc., Milpitas, CA (US)

( * ) Notice: Subject to any disclaimer, the term of this patent is extended or adjusted under 35 U.S.C. 154(b) by 2 days.

(21) Appl. No.: 12/798,560

(22) Filed: Apr. 7, 2010

(65) Prior Publication Data

US 2011/0249364 A1    Oct. 13, 2011

(51) Int. Cl.
*G11B 5/17* (2006.01)
*G11B 5/23* (2006.01)

(52) U.S. Cl. .............. 29/603.23; 29/603.11; 29/603.13; 360/123.12; 360/123.18; 360/123.37; 360/123.45

(58) Field of Classification Search ............... 29/603.11, 29/603.13, 603.23, 603.25; 360/119.03, 360/123.12, 123.18, 123.37, 123.45
See application file for complete search history.

(56) References Cited

U.S. PATENT DOCUMENTS

| | | | |
|---|---|---|---|
| 7,228,619 B2 * | 6/2007 | Le | 29/603.13 X |
| 7,477,481 B2 | 1/2009 | Guthrie et al. | |
| 2005/0259356 A1 * | 11/2005 | Han et al. | 360/119.03 X |

FOREIGN PATENT DOCUMENTS

JP    2007257711 A    * 10/2007

* cited by examiner

*Primary Examiner* — A. Dexter Tugbang
(74) *Attorney, Agent, or Firm* — Saile Ackerman LLC; Stephen B. Ackerman

(57) ABSTRACT

A process (and the structure resulting therefrom) is described for manufacturing a magnetic write head in which there is no physical interface between the first and second trailing shields. This is achieved by laying down a sacrificial layer which is patterned to extend inwards towards the top yoke whereby the dimensions and shapes of the shields are defined.

12 Claims, 5 Drawing Sheets

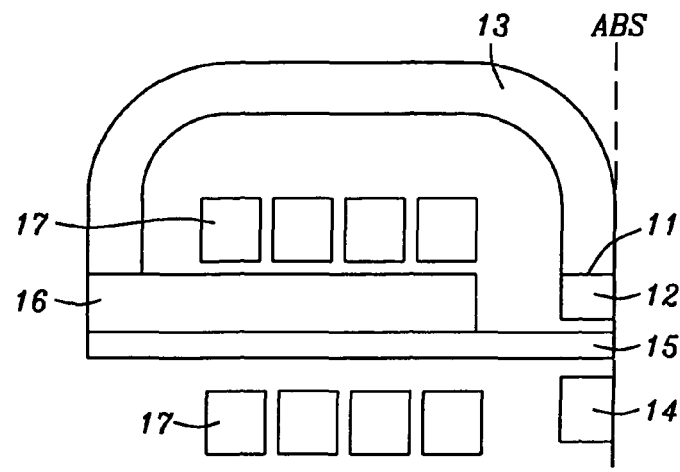
FIG. 1 – Prior Art
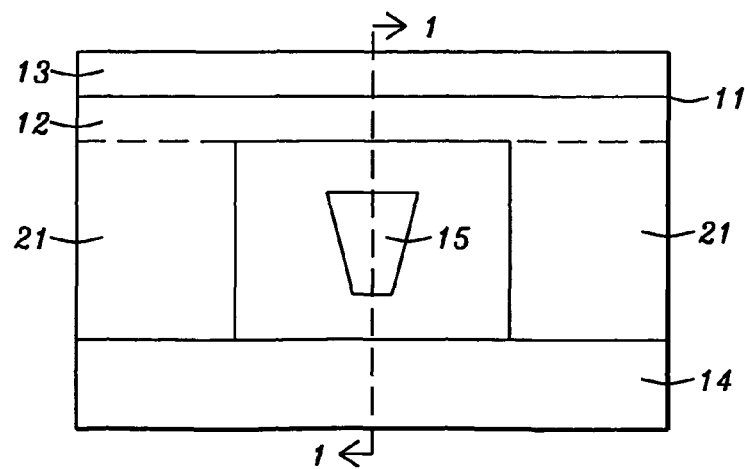
FIG. 2a – Prior Art

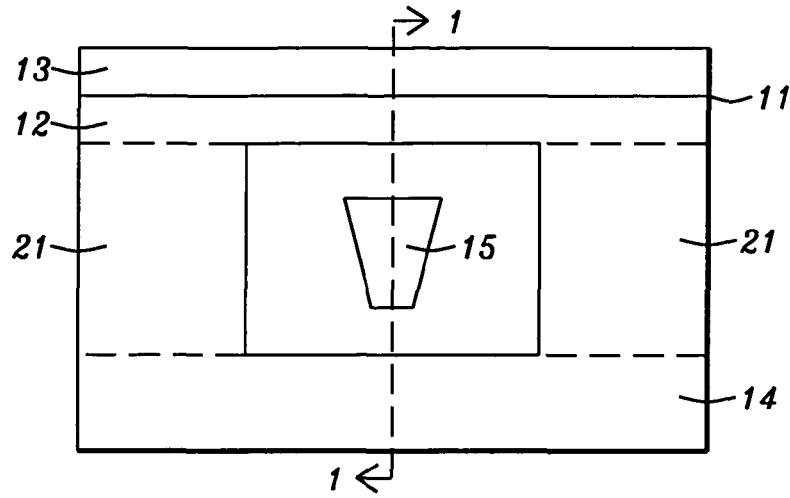
FIG. 2b - Prior Art
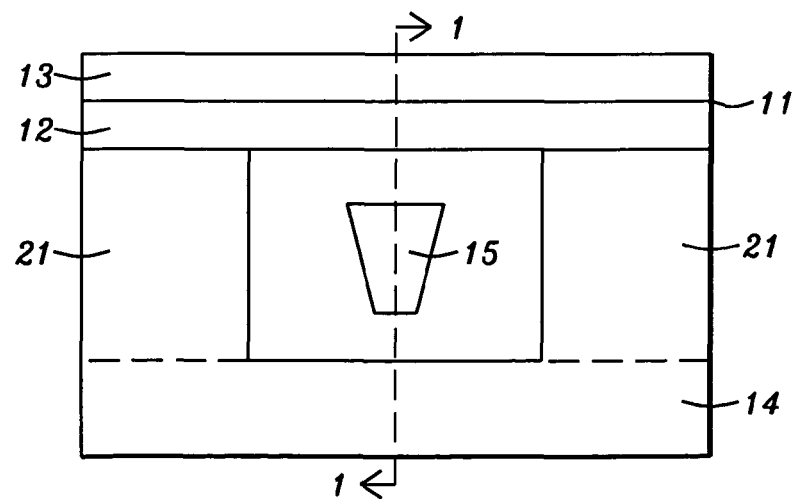
FIG. 2c - Prior Art

METHOD OF MAKING A PMR WRITER WITH SEAMLESS SHIELDS

FIELD OF THE INVENTION

The invention relates to the general field of perpendicular magnetic write heads with particular attention to the formation of the first and second trailing shields.

BACKGROUND OF THE INVENTION

In perpendicular magnetic recording (PMR), a trailing shield, as well as side shields and a leading shield, are used in order to produce a greater on-track field gradient thereby achieving a better signal to noise ratio together with high linear density and lower fringing fields for this high track density.

FIG. 1 is a cross-sectional view of a magnetic write head of the prior art. As can be seen, interface 11 is present between first trailing shield 12 and second trailing shield 13. Also shown in the figure are leading shield 14, main pole 15, top yoke 16, and field coils 17.

FIGS. 2a-2c show air-bearing surface (ABS) views of FIG. 1 for three of several different arrangements of the shields that are possible. In all three figures unlabeled diagonal arrows indicate wherever there is a physical interface between two regions (such as 11 in FIG. 1) while the presence of broken lines separating two regions having different functions (e.g. between side shields 21 and first trailing shield 12 in FIG. 2a. Note the presence of physical interface 11 in all three figures. Although no corresponding figure has been provided, write heads that are otherwise similar to those shown in FIG. 2, but having no side shields, are also sometimes used.

Unfortunately, the various shields shown in FIGS. 1 and 2 often cause unintended data erasure that is largely dependent on the geometry of the shields. The present invention has determined the source of the unintended erasure and discloses how this problem may be overcome.

A routine search of the prior art was performed with the following representative reference of interest being found:

In U.S. Pat. No. 7,477,481, Guthrie et al. show only one trailing shield. Note that no references teaching first and second trailing shields nor of the use of a sacrificial material in forming the trailing shield, were found.

SUMMARY OF THE INVENTION

It has been an object of at least one embodiment of the present invention to fix the far track accidental erasure problem in a shielded writer.

Another object of at least one embodiment of the present invention has been to eliminate domain wall collisions at the shield interfaces, thereby preventing the formation of the hot spots that are responsible for far track erasure.

Still another object of at least one embodiment of the present invention has been to eliminate as many interfaces as possible between multiple shield layers by providing a single piece seamless trailing shield.

A further object of at least one embodiment of the present invention has been to provide a method of forming said seamless trailing shield.

These objects have been achieved by the introduction of a sacrificial layer immediately after the top yoke plating has been done and the photoresist mold stripped. This sacrificial layer defines the shape and dimensions of the first trailing shield. Its later removal facilitates formation of the first and second trailing shields in a single step.

Another important feature of the invention is that the seed layer, once it has served its primary purpose of enabling the electroformation of the top yoke, is only partly removed (by ion milling or by liftoff). This feature allows the seed layer to remain on top of the write gap layer so that it may protect the latter when the sacrificial layer is removed later on.

BRIEF DESCRIPTION OF THE DRAWINGS

FIG. 1 is a cross-sectional view of a perpendicular magnetic write head of the prior art.

FIGS. 2a-2c show ABS views of three possible versions of FIG. 1.

DESCRIPTION OF THE PREFERRED EMBODIMENTS

Although there are methods that allow one step formation of leading shield and side shield, or side shields and first trailing shield, or even leading shield, side shields and first trailing shield, what is common to all these examples of the prior art is that the first trailing shield and the second trailing shield are always formed separately. In today's standard practice, the first trailing shield is formed and planarized, following which the second trailing shield is formed on top of the first trailing shield. Inevitably, this results in the presence of a physical interface between the two trailing shields.

The relationship between this physical interface and the unintended erasure of data by the shield(s), that was mentioned earlier, was investigated using Magnetic Force Microscopy (MFM) images of two writers, at air bearing surfaces (ABS). Both writers had side shields as well as first and second trailing shields. In both cases, domain walls that originated near the main pole were seen to propagate until they collided with the horizontal domain wall at the interface between the first and second trailing shields.

Further investigation determined that these domain wall collisions were the cause of the (unintended) far track erasure. This demonstrated that, if this type of far track erasure is to be eliminated, it is critical to remove the possibility for domain wall collision to occur inside the shields. It was further determined that the best way to achieve this was to make it impossible for the horizontal domain wall (caused by the physical discontinuity between the first and second trailing shields) to form at all.

This is accomplished by the invention through the formation of both the first trailing shield and the second trailing shield in a single process that eliminates the possibility of any physical interface forming between them so that the trailing shield becomes a single seamless piece. This process, that we describe immediately below, will also serve to make clear the structure of the present invention.

The disclosed process has the additional advantage that it remains compatible with, and may be applied to, prior art processes for eliminating interfaces between leading shield and side shield, and between side shield and first trailing shield. Consequently, all shield layers (leading, side, first trailing, and second trailing) may be formed into a single seamless piece.

Figure 3:
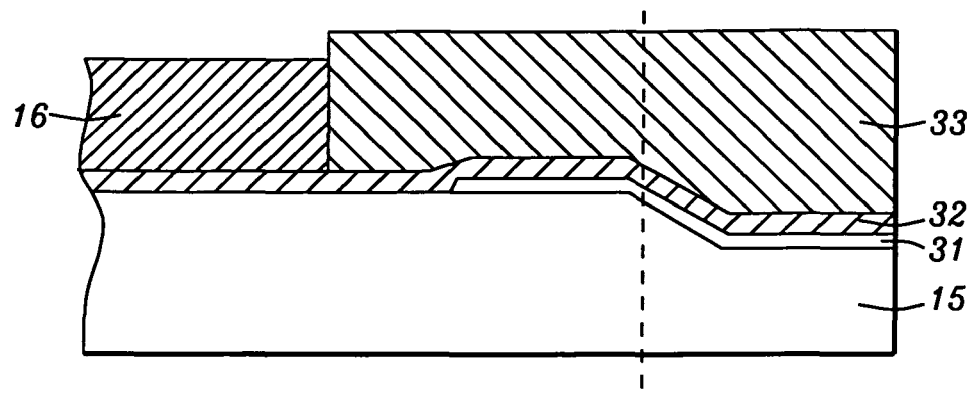
FIG. 3 illustrates the initial structure that is the starting point for manufacturing the invention.

Referring now to FIG. 3, the process of the invention starts with main magnetic pole 15 which has upper and lower horizontal top surface portions, connected by a sloping portion. The broken line that passes through the approximate center of the sloping portion marks the future location of the ABS.

Also shown in FIG. 3 are non-magnetic write gap layer 31 and electrically conductive seed layer 32. Photoresist mold 33 is formed on seed layer 32, using standard photolithographic techniques, and top yoke 16 is electroformed therein on seed layer 32. Photoresist mold 33 is then stripped away in the usual way.

Figure 4:
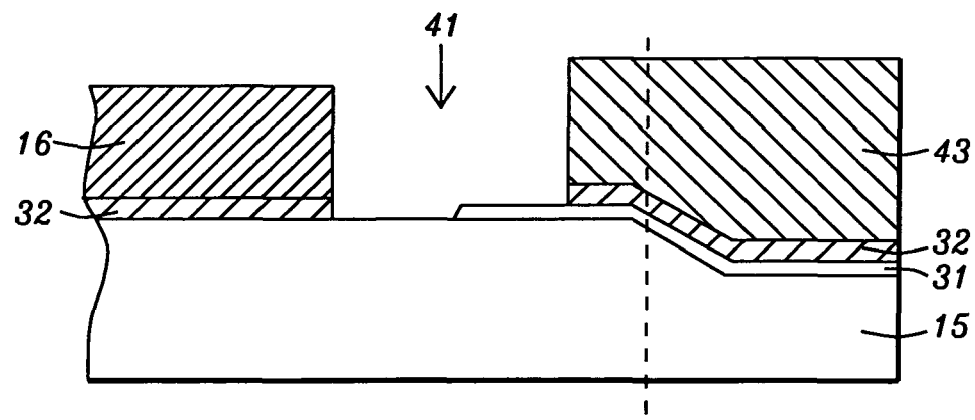
FIG. 4 shows how a sacrificial layer, which defines the shape and dimensions of the first trailing shield, is introduced.

Now follows a key novel step: As shown in FIG. 4, sacrificial layer 43 is laid down on seed layer 32 following which it is patterned to terminate beyond the sloping portion about 2 microns therefrom, which causes write gap layer 31 to extend about halfway into space 41 that separates sacrificial layer 43 from top yoke 16. Thus sacrificial layer 43 defines the shape and dimensions of the first trailing shield.

Sacrificial layer 43 may be photoresist or it could of any material that can be selectively removed later. Examples include, but are not limited to, NiFe, CoNiFe, silicon nitride, and Cu. With the sacrificial layer in place, the exposed portion of seed layer 32 is selectively removed using ion beam etching.

Figure 5:
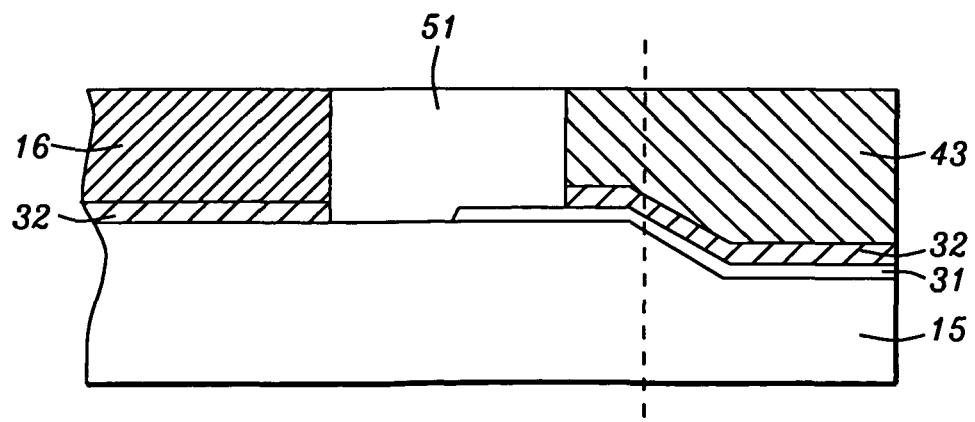
FIG. 5 shows the formation of insulation to separate the shields from the main pole.

Moving on to FIG. 5, after removing all parts of seed layer 32 that are not covered by sacrificial layer 43 (or by top yoke 16), insulating layer 51 is deposited to an initial thickness that exceeds that of sacrificial layer 43, following which the full structure is planarized until there is no longer any insulating material on either top yoke 16 or sacrificial layer 43. Examples of possible materials for layer 51 include, but are not limited to, alumina. Layer 51 is deposited to a thickness in a range of from 0.3 to 1.5 microns.

Figure 6:
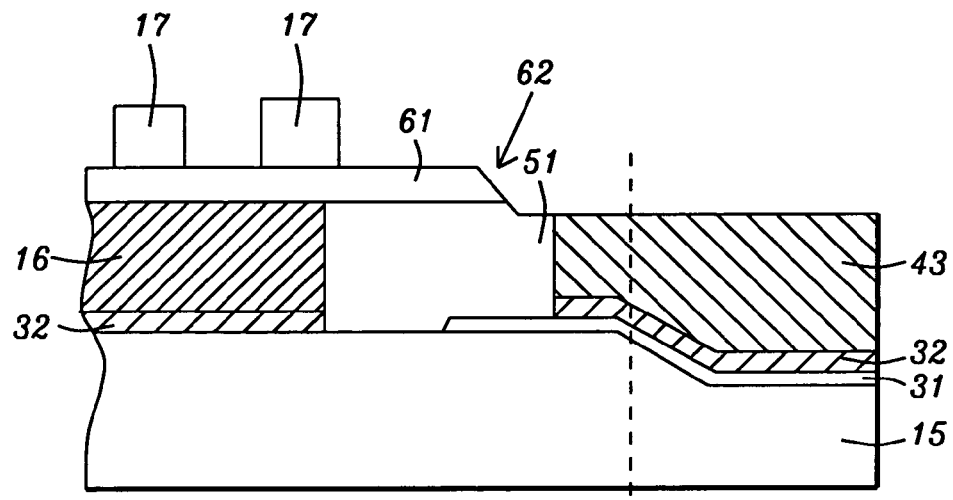
FIGS. 6 and 7 illustrate removal of the sacrificial layer and the formation of the upper field coils.

Next, as illustrated in FIG. 6, insulating layer 61 is deposited on top yoke 16 and insulating layer 51. Examples of suitable materials for layer 61 include, but are not limited to, alumina. Layer 61 is deposited to a thickness in a range of from 0.05 to 0.5 microns. Part of insulating layer 61 then removed (through ion beam milling or through a liftoff process) and is given beveled edge 62 which is located between 0.2 and 2 microns from the outer edge of layer 51.

Figure 7:
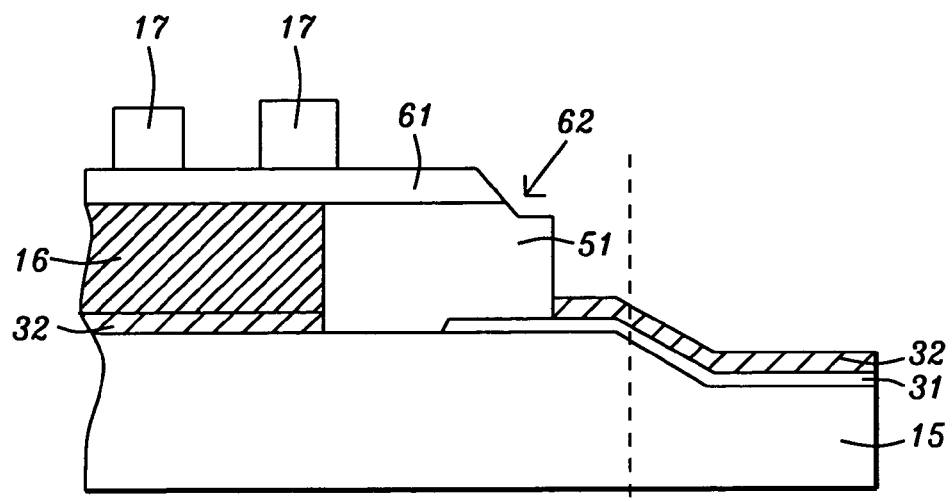

Then, as shown in FIG. 7, part of field coil 17 is formed on insulating layer 61 over top yoke 16. Now follows the removal of sacrificial layer 43 with seed layer 32 remaining in place to protect write gap layer 31.

Figure 8:
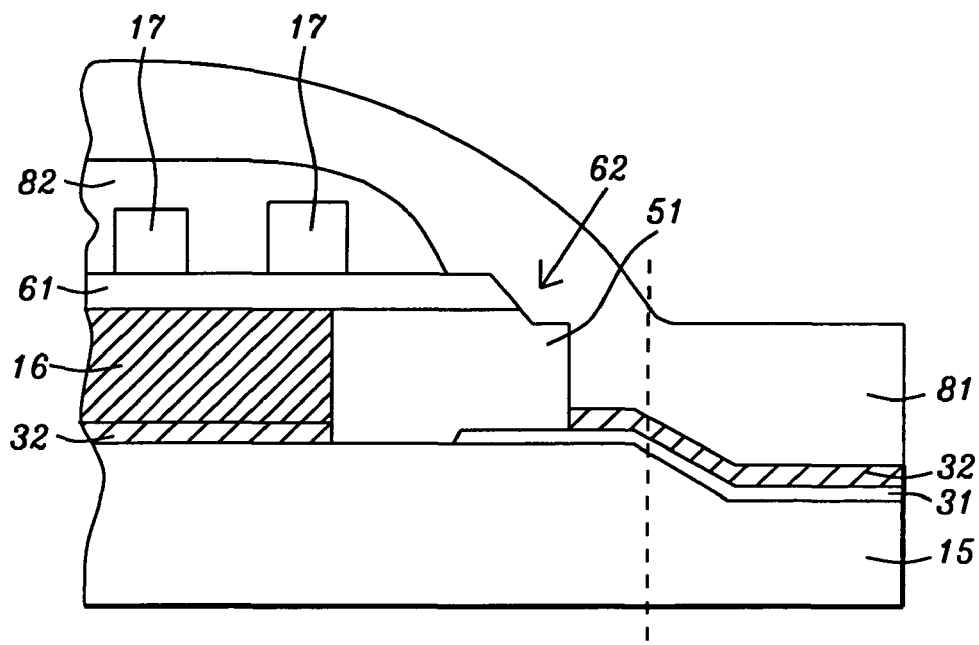
FIG. 8 shows formation of the coil housing and the laying down of both the first and second trailing shields in a single deposition.

As seen in FIG. 8, the process concludes by covering field coils 17 and insulating layer 61 with insulating material 82, whose melting/softening point is below about 200° C. This is followed by heating layer 82 until it softens (or has been softened by chemical means) so that it assumes a lenticular shape. After layer 82 has been allowed to harden (through cooling or by some other means, if appropriate), magnetic layer 81 is deposited to fully contact layers 32, 51, 61, and 82, thereby forming seamlessly connected first and second trailing shields.

Figure 9:
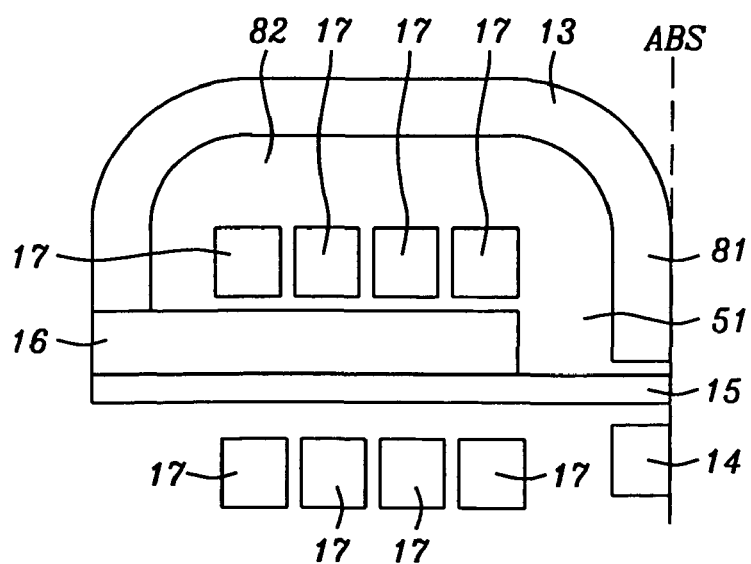
FIG. 9 shows the final structure as manufactured according to the process of the invention.

A comparison of FIGS. 1 and 9 shows them to be essentially the same except for the absence of physical interface 11 in FIG. 9.

ALTERNATIVE EMBODIMENTS

Since the sacrificial layer (commonly a dummy photoresist) will be removed later, other materials, such as SiN, which are selectively removable relative to $Al_2O_3$ and magnetic metal, may be substituted. In that case, the removal method of this alternative sacrificial material will be different, for example, RIE (reactive ion etching). Alternatively, appropriate metal materials could be used for the sacrificial material. In this case, the selective removal process could be implemented using a wet etch procedure.

What is claimed is:

1. A process to manufacture seamlessly connected first and second trailing shields for a perpendicular magnetic write head having a field coil, comprising:

providing a main magnetic pole having a top surface consisting of a horizontal upper portion, a sloping portion, and a horizontal lower portion that extends away from said sloping portion before terminating at an edge;

further providing a non-magnetic write gap layer, that contacts said lower and sloping portions and part of said upper portion;

also providing a seed layer on, and contacting, said non-magnetic write gap layer as well as all portions of said main pole not covered by said non-magnetic write gap layer;

using a photoresist mold, forming a top yoke for said write head by electro-plating on said seed layer and then removing said photoresist mold;

laying down a sacrificial layer on said seed layer and then patterning said sacrificial layer to extend inwards to a location on said upper portion that is a first distance from said top yoke whereby said sacrificial layer defines dimensions and shape for said first trailing shield;

removing all parts of said seed layer that are not covered by said sacrificial layer;

depositing a first insulating layer whose thickness is at least as great as that of said sacrificial layer and then planarizing until there is no longer any insulating material on either said top yoke or said sacrificial layer;

depositing a second insulating layer to contact said top yoke and said first insulating layer, then removing part of said second insulating layer and giving said second insulating layer a beveled edge that is located over said first insulating layer at a second distance from said sacrificial layer;

forming part of said field coil on said second insulating layer over said top yoke and then removing said sacrificial layer without damaging said write gap layer by virtue of protection provided thereto by said seed layer;

covering said part of said field coil and said second insulating layer with a third layer of insulating material;

causing said third insulating layer to soften sufficiently to assume a lenticular shape;

allowing said third insulating layer to harden while retaining said lenticular shape; and then depositing a magnetic layer on, and contacting, said first, second, and third insulating layers, as well as said seed layer, thereby forming said seamlessly connected first and second trailing shields.

2. The process recited in claim 1 wherein said sacrificial layer is a photoresist.

3. The process recited in claim 2 wherein said sacrificial layer is selectively removed by oxygen-based reactive ion etching.

4. The process recited in claim 1 wherein said seed layer is a magnetic alloy selected from the group consisting of NiFe, CoFe, and CoNiFe.

5. The process recited in claim 1 wherein said sacrificial layer is selected from the group consisting of NiFe, CoNiFe, SiN, $SiO_2$, and Cu.

6. The process recited in claim 5 wherein said sacrificial layer is selectively removed by wet chemical etching or by reactive ion etching.

7. The process recited in claim 1 wherein said first distance of said sacrificial layer from said top yoke is in a range of from 0.5 to 3 microns.

8. The process recited in claim 1 wherein said second distance of said beveled edge from said sacrificial layer is in a range of from 0.2 to 2 microns.

9. The process recited in claim 1 wherein said first layer of insulation is alumina and is deposited to a thickness in a range of from 0.3 to 1.5 microns.

10. The process recited in claim 1 wherein said second layer of insulation is alumina and is deposited to a thickness in a range of from 0.05 to 0.5 microns.

11. The process recited in claim 1 wherein the step of removing part of said second insulating layer and then giving said second insulating layer said beveled edge is achieved through ion beam milling or through a liftoff process.

12. The process recited in claim 1 wherein additional shields are added to said first and second trailing shields, thereby forming a single seamless object comprising a leading shield, side shields, and trailing shields.

* * * * *